(12) United States Patent
Myers

(10) Patent No.: US 11,489,963 B1
(45) Date of Patent: Nov. 1, 2022

(54) AGENT LOGGING SYSTEM

(71) Applicant: Express Scripts Strategic Development, Inc., St. Louis, MO (US)

(72) Inventor: Christopher M. Myers, Dublin, OH (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 255 days.

(21) Appl. No.: 17/038,053

(22) Filed: Sep. 30, 2020

(51) Int. Cl.
| H04M 3/51 | (2006.01) |
| G06N 3/08 | (2006.01) |
| G06Q 30/00 | (2012.01) |
| G10L 15/26 | (2006.01) |
| H04M 3/42 | (2006.01) |

(52) U.S. Cl.
CPC ............ *H04M 3/5183* (2013.01); *G06N 3/08* (2013.01); *G06Q 30/01* (2013.01); *G10L 15/26* (2013.01); *H04M 3/42221* (2013.01)

(58) Field of Classification Search
CPC .......... G06N 3/08; G06Q 30/00; G06Q 30/01; G10L 15/08; G10L 15/26; H04M 3/42; H04M 3/42221; H04M 3/51; H04M 3/5183
USPC ....................................... 379/265.03–265.09
See application file for complete search history.

(56) References Cited

U.S. PATENT DOCUMENTS

| 7,292,689 | B2 | 11/2007 | Odinak |
| 7,386,850 | B2 | 6/2008 | Mullen |
| 7,391,860 | B2 | 6/2008 | Odinak |
| 8,116,445 | B2 | 2/2012 | Odinak |
| 8,457,296 | B2 | 6/2013 | Odinak |
| 8,462,935 | B2 | 6/2013 | Odinak |
| 8,666,032 | B2 | 3/2014 | Odinak |
| 8,990,084 | B2 | 3/2015 | Gorin |
| 9,014,362 | B2 | 4/2015 | Odinak |
| 9,368,106 | B2 | 6/2016 | Sidi |
| 9,565,310 | B2 | 2/2017 | Odinak |
| 9,667,789 | B2 | 5/2017 | Odinak |
| 9,818,401 | B2 | 11/2017 | Printz |
| 9,942,401 | B2 | 4/2018 | Odinak |
| 10,147,418 | B2 | 12/2018 | Sidi |
| 10,152,972 | B1 | 12/2018 | Thomas et al. |
| 10,354,642 | B2 | 7/2019 | Gurunath Kulkarni |
| 10,404,859 | B1 | 9/2019 | Hernandez |
| 10,554,817 | B1 | 2/2020 | Sullivan |
| 10,999,436 | B1 * | 5/2021 | Myers .................. H04M 3/527 |
| 2005/0246177 | A1 | 11/2005 | Long |

(Continued)

*Primary Examiner* — Harry S Hong
(74) *Attorney, Agent, or Firm* — Schwegman Lundberg & Woessner

(57) ABSTRACT

A system for generating a merged agent log starts with a processor receiving an audio signal of a communication session between a member-related client device and an agent client device. Processor processes the audio signal to generate caller utterances and generates identified tasks based on the caller utterances. The processor then generates caller utterance data including the identified tasks and a start time of the caller utterances and an end time of the caller utterances. The processor groups the caller utterances based on the identified tasks, and for each of the identified tasks, the processor generates an agent log using an agent logging neural network. The agent log is based on the caller utterances. Other embodiments are disclosed herein.

20 Claims, 9 Drawing Sheets

(56) References Cited

U.S. PATENT DOCUMENTS

| | | | |
|---|---|---|---|
| 2010/0104086 A1* | 4/2010 | Park | H04M 3/51 |
| | | | 379/265.09 |
| 2011/0228915 A1 | 9/2011 | Chen | |
| 2019/0014213 A1 | 1/2019 | Destiny | |
| 2019/0327103 A1* | 10/2019 | Niekrasz | G10L 15/26 |
| 2020/0137224 A1 | 4/2020 | Rakshit | |
| 2020/0311738 A1* | 10/2020 | Gupta | G06F 16/22 |
| 2021/0375277 A1* | 12/2021 | Lai | G06F 40/35 |
| 2022/0103686 A1* | 3/2022 | Shukla | G10L 15/30 |

* cited by examiner

AGENT LOGGING SYSTEM

CROSS-REFERENCE TO RELATED APPLICATIONS

This application is related to U.S. patent application Ser. No. 16/444,535, filed Jun. 18, 2019, and entitled "AGENT ACTION RANKING SYSTEM," which is incorporated by reference herein.

BACKGROUND

Since a user's perception of an organization can be greatly influenced by the customer service that is provided to the user, the organization has interest in ensuring that the user's experience with the customer service is impeccable. While, traditionally, customer service is a face-to-face interaction between the user and an agent that is employed by the organization, in order to increase the ability for the user to access to an agent of the organization, customer service is now accessible via many different means of communication. For example, a user may communicate with a human agent or an automated agent via an audio call (e.g., voice over IP (VoIP), telephone) or via an electronic messaging (e.g., online chat, text messaging).

Whether the user is interacting with a human agent or an automated agent, customer service aims to help the user complete his transaction in the most timely and efficient manner while ensuring that the user's experience with the customer service is enjoyable.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
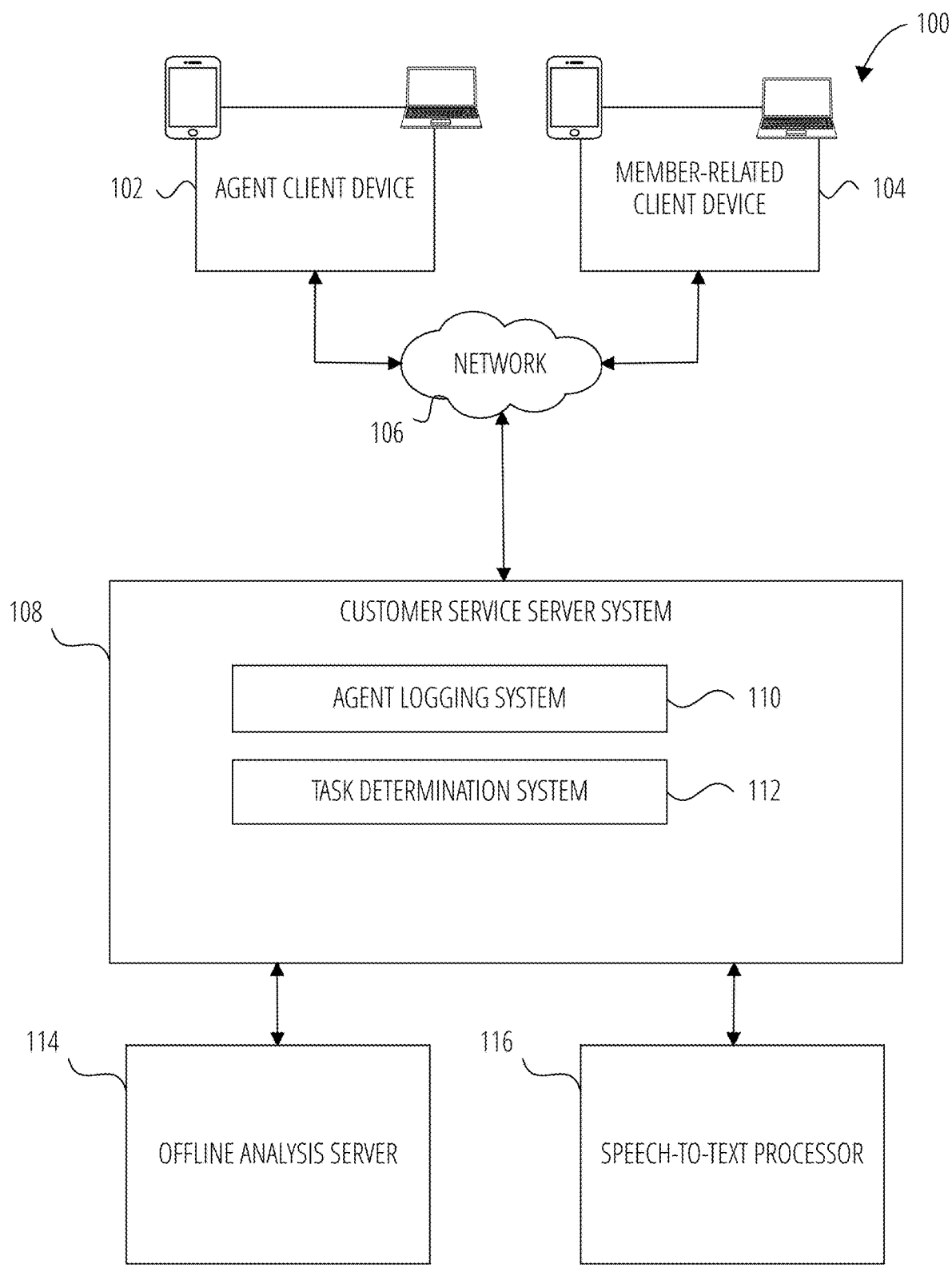
FIG. 1 is a block diagram showing an example system 100 including an agent logging system 110 according to various exemplary embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of customer service methods and systems. An organization can provide its customers or members with access to customer service via different communication channels including audio calls (e.g., telephone call, VoIP, audio message, etc.) or via electronic messages (e.g., online chat, instant messaging, email, etc.). Optimally, the customer service experience via each of the communication channels should be equally timely, efficient and enjoyable for the user seeking service.

A user, e.g., a member or a representative of the member, may also access the customer service system of the organization. The user may contact customer service to accomplish a variety of tasks that can greatly vary in complexity. For example, simple tasks include getting assistance in registering for a username and password on the organization's website, or resetting a password associated with an online account while more complex tasks include checking an order status, placing a refill order, requesting information regarding a prescription, or requesting an explanation of benefits and terms associated with an account.

To add further complexity to the servicing the user, the user can also be contacting customer service on behalf of someone else. For example, when the service provided by the organization is medical in nature, customer service call centers can receive calls or electronic messages from a user regarding prescriptions for another patient such as the user's child, spouse, parent, or charge. The user may be the member (or benefit holder). The patient (e.g., the user's child, spouse, parent, or charge) may be the member. The user can also be a professional caregiver contacting the customer service on behalf of the patient, who is the member.

A medical group may use the customer service methods and systems as described herein. A medical group may include members, people who benefit from the medical group or are provided with medical treatment by the group. The medical group can be a medical insurer. The medical group can be a pharmacy benefit manager (PBM). The PBM may store data regarding member usage of prescription drugs. This data may be leveraged in order to provide a member the prescription coverage benefit (adjudicate the claim for the benefit) and may be paid for by a client of the PBM. The clients of the PBM can include employers, group purchasing organizations, medical health plans and governmental groups. In general, prescription drug and medicine data may be accessed from a PBM database. One or more operations may be performed on the prescription drug and medicine data to success data between a member and a user contacting the medical group system as described herein. The user contacting the medical group system can include a person related to the patient, a guardian of the patient, a caregiver of the patient, a medical care provider of the patient. In some cases, the user is also a member and is contacting the medical group on behalf of another member.

The tasks that the user wishes to complete are also associated with a different level of criticality that affects the interaction between the user and the (customer service) agent. For example, a user (e.g., the member or benefit holder) may be calling about his medication that he has not yet received, or a user may be calling on behalf of a member who has not yet received their prescription medication. The criticality of the call would depend on the type of medication he is waiting on. The type of medication he is waiting on would be stored in the database of the PBM.

Given these complexities, the agent of the customer service generates agent logs to document the interaction with the user that is calling customer service. The agent logs can include, for example, inputting the user's identification, prescription number, user's contact information, the date and time of the call or the date and time associated with the user's requested task, etc. All of this information helps the agent as well as future agent better service the user. However, generating and inputting the agent log is time consuming. It requires effort on the part of the agent and further, prevents the agent from moving on to helping other users until the agent log is completed.

Accordingly, to further improve the functionality of customer service software and systems, an embodiment of the present disclosure generates a merged agent log based on caller utterances in an audio signal of a communication session using an agent logging neural networks 206 in an agent logging system 110. The merged agent log includes, for example, member context (e.g., member or patient identification, prescription number, etc.), caller utterance data, the identified tasks, a start time of each of the identified tasks, and an end time of each of the identified tasks, a search variable associated with each of the identified tasks, success value associated with each of the identified tasks, etc. By generating this merged agent log, the agent logging system 110 can render more efficient the customer service system as well as the agents of the customer service server system 108.

NETWORKED COMPUTING ENVIRONMENT

FIG. 1 is a block diagram showing an example system 100 according to various exemplary embodiments. The system 100 can be a customer service system that includes a customer service server system 108, an agent client device 102, and a member-related client device 104 that are communicatively coupled over a network 106 (e.g., Internet, telephony network, electronic communication network or the like).

The agent client device 102 and the member-related client device 104 can be communicatively coupled via an audio call (e.g., VoIP, Public Switched Telephone Network, cellular communication network, etc.) or via electronic messages (e.g., online chat, instant messaging, text messaging, email, and the like). In another embodiment, the agent client device 102 and the member-related client device 104 are communicatively coupled via a voice call, e.g., using a telephony network 106. While FIG. 1 illustrates a single agent client device 102 and a single member-related client device 104, it is understood that a plurality of agent client devices 102 and a plurality of member-related client devices 104 can be included in the system 100 in other embodiments. As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The member-related client device 104 can include a microphone and speaker on a mobile electronic device, a telephone, or a self-service kiosk, e.g., at a pharmacy, a clinic, a doctor's office, a mobile relief center, and the like. The member-related client device 104 can also include telecommunications devices for the deaf (TDD).

The network 106 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, Gobi™, Bluetooth™, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user using the member-related client device 104 can establish a communication session with an agent associated with the agent client device 102. The agent can be a human agent or an automated agent, e.g., on behalf of an organization. The automated agent can be associated with a medical group that includes the member. The automated agent can be an interactive voice response (IVR), a virtual online assistant, or a chatbot. During a communication session between the user and the agent, the customer service server system 108 identifies the member using initial context data (e.g., the phone number the member is calling from, the website login information inputted, automatic number identification (ANI), etc.) and retrieves the data on the member (e.g., member account information, name, address, insurance information, information on spouse and dependents, etc.).

The customer service server system 108 in FIG. 1 includes an agent logging system 110 and a task determination system 112. The customer service server system 108 can further include elements described with respect to FIG. 8 and FIG. 9, such as a processor and memory, having instructions stored thereon, that when executed by the processor, causes the processor to control the functions of the customer service server system 108.

As shown in FIG. 1, the system 100 can also include an offline analysis server 114 and a speech-to-text processor 116 that are communicatively coupled to each other and to the customer service server system 108. In one embodiment, the offline analysis server 114 and the speech-to-text processor 116 is included in the customer service server system 108 and communicatively coupled to the agent logging system 110 and the task determination system 112.

Task Determination System:

In the customer service server system 108 of FIG. 1, the task determination system 112 processes information during the communication session between a user and an agent to generate an identified task. The identified task is the task that the user is wanting to complete during the communication session. The task can be related to the member that is the user, the user's spouse, child, charge, etc. Examples of tasks include, for example, checking on an order status, refilling a prescription, asking questions about a claim, paying a bill, etc. The task determination system 112 may include an API server, task determination application server that generates the identified task, and a database to store communication session information. The communication session information includes, for example, initial context information related to the member (e.g., user or patient) such as website login information, automatic number identifier, telephone number, as well as member account information such as name, address, employer, medication, insurance information, preferred pharmacy, and information on member's spouse or dependents.

The task determination system 112 receives data (e.g., strings included in the transcribed or digitized utterances, recorded utterances, or electronic messages) and transmits data (e.g., identified task) to, for example, the agent client device 102 and the agent logging system 110.

Strings that are on the transcribed or digitized utterances or electronic messages can be an array data structure of words comprising phrases of input from a user. For example, a string can be an array of characters that contains the data from the automated transcription. The string can include one or more words that was provided by the user in response to a query. The string can also include a series of singularly spoken letters or number. For example, the user may be providing a member identification number or a prescription number. The string can also include a combination of words and singularly spoken letters or numbers. To generate the strings, the speech-to-text processor 116 can implement Fast Fourier Transforms (FFTs) or Neural Networks such as Long-Short Term Memory Neural Networks (LSTM).

The task determination system 112 can receive and transmit data in real-time. In one embodiment, the task determination system 112 receives data (e.g., strings that are on the transcribed utterances or electronic messages) from the agent logging system 110 that is performing offline analysis of call recordings, audio strings or chat transcripts between the member-related client device 104 and the agent client device 102.

In one embodiment, the offline analysis server 114 is included in the customer service server system 108 and is performing the offline analysis. In another embodiment, the offline analysis server 114 is separate from customer service server system 108 and is performing the offline analysis. In one embodiment, the string that is an electronic message can be a portion of an online chat exchanged between the agent and the member that is received by the processor in real time. In this embodiment, the speech-to-text processor 116 generates strings by processing online chat to parse and separate the different portions of the online chat.

Digitized utterances can be digitized audio files of user audio during the communication session. In this embodiment, the task determination system 112 can transmit data (e.g., an identified task) to the agent logging system 110 offline. In an example embodiment, offline can be when the user (e.g., using the member-related client device 104) is not engaged with the customer service server system 108. Offline can include a different communication path or session than the communication between the agent client device 102 and the member-related client device 104 or to the customer service server system 108.

When the communication session between the agent client device 102 and the member-related client device 104 is an audio communication, the audio communication is processed in the customer service server system 108 (e.g., speech-to-text processor 116) to convert each utterance from speech to text to generate a string that is received by the task determination system 112. In an embodiment, the audio communication is processed in the customer service server system 108 to generate each user utterance to a user audio string.

Agent Logging System:

In the customer service server system 108 of FIG. 1, the agent logging system 110 processes the information during the communication session between a user and an agent and to generate a merged agent log. The merged agent log is a log of pertinent information gathered during the communication session. For example, the merged agent log can include member context (e.g., member or patient identification, prescription number, etc.), caller utterance data, the identified tasks, a start time of each of the identified tasks, and an end time of each of the identified tasks, a search variable associated with each of the identified tasks, success value associated with each of the identified tasks, etc.

Figure 2:
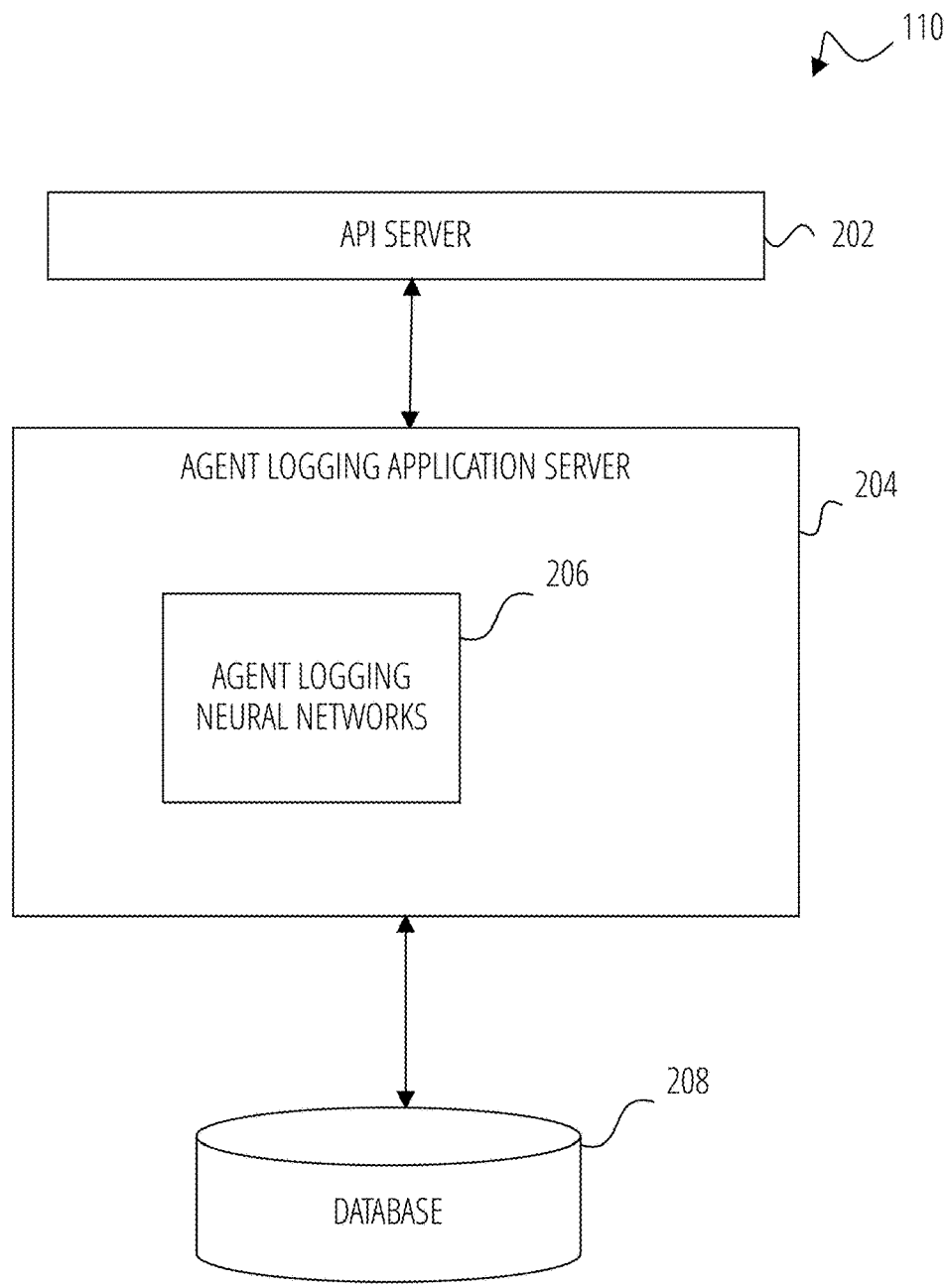
FIG. 2 is block diagram illustrating further details regarding the agent logging system 110, according to exemplary embodiments.

FIG. 2 is block diagram illustrating further details regarding the agent logging system 110, according to exemplary embodiments. The agent logging system 110 includes an API server 202 that is coupled to and provides a programmatic interface to an agent logging application server 204. For example, the agent logging application server 204, using the API server 202, receive real-time access to the communication session between the user and the agent (e.g., between agent client device 102 and member-related client device 104). The communication session can include, for example, an interactive voice response (IVR) or a voice call with an agent that can be a human agent or an automated agent. The agent logging application server 204 may also use a batch interface to receive call recordings and agent logs or analytics of the communication session from an external system for offline processing and training of the agent logging application server 204.

The agent logging application server 204 can further include speech-to-text processor (not shown) that converts or transcribes an audio signal (e.g., the interactive voice response (IVR), the voice call, or the call recordings) into a transcribed audio signal, identifies separate parties in the audio signal and generates start and end times for each utterance included in the audio signal. The separate parties in the audio signal include for example the caller (e.g., user or member) and the agent. The agent logging application server 204 can identify agent utterances from the utterances included in the audio signal and can separate the audio caller utterance from the audio signal using the start and end times for each of the utterances. The agent logging application server 204 can then select the transcribed caller utterance from the transcribed audio signal based on the audio caller utterance. The agent logging application server 204 can select the audio caller utterances from the audio signal.

As shown in FIG. 2, the agent logging application server 204 includes an agent logging neural networks 206. The agent logging neural networks 206 can be a Recurrent Neural Network (RNN). In one embodiment, the agent logging neural networks 206 includes a plurality of neural networks, each associated with a different task. Examples of different tasks include checking on a status of an order, changing an address, changing a name, updating dependents, changing pharmacy for delivery, etc.

Each of the tasks is thus allocated one neural network that is trained offline (e.g., using the offline analysis server 114) to generate an agent log for the task to which it is allocated. For example, a first neural network is trained to generate an agent log for the task of the checking on an order status while a second neural network is trained to generate an agent log for the task of changing an address, etc. Each of the neural networks in the agent logging neural networks 206 can be a Long Short-Term Memory (LSTM) neural networks. The LSTM neural networks can also be bi-directional LSTM neural networks. In an example embodiment, the first neural network may generate an agent log for the string "where is my prescription order?", which is stored in the database 208. The agent log can include for example the name of the caller, the prescription number, the start and end time of the caller utterance "where is my prescription order?", whether the task of providing the order status was successfully completed, etc.

In one embodiment, each Long-Short Term Memory Neural Networks (LSTM) neural network processes the string at an input layer, an embed layer, an LSTM layer, an Attention Layer and an output layer. The input layer receives the string and separate the string into separate words. The input layer can also receive portion of a call log associated with the string that identifies, for example, the speaker and the start and end time of the utterance of the string. The string can be, for example, "where is my prescription?". Each word in the string and the portion of the call log is passed to a subsequent layer for processing. For example, the embed layer can receive and translate each word into numerical values. The LSTM layer generates a value for each word, but the value generated for the first word is carried over to the analysis of the second word. The LSTM layer and Attention layer creates a semantic understanding of the task given that there is a memory of the analysis of each word that is carried over. This allows the neural network to assess a whole string more accurately by virtue of having context. The Output layer is the final layer that receives the words for processing and outputs the agent log for the task. The agent log for this task can include an identification of the type of task associated with the string (e.g., "Order Status"), a start time and an end time of the caller utterance (e.g., "Where is my prescription?"). In an example embodiment, the neural networks can include a Gated Recurrent Unit (GRU) neural network.

In one embodiment, an agent log for the task associated with the neural network is generated as an output to the LSTM neural network associated with that task. The merged agent log is generated by merging all the agent logs generated by the plurality of LSTM neural networks in the agent logging neural networks 206.

The agent logging application server 204 is communicatively coupled to the database 208, in which is stored data processed by the agent logging application server 204 to generate the merged agent log, as further described herein. In one embodiment, rather than including neural networks, the agent logging application server 204 includes a memory that stores instructions, when executed by a processor, causes processor to perform the operations of the agent logging application server 204.

DATA ARCHITECTURE

Figure 3:
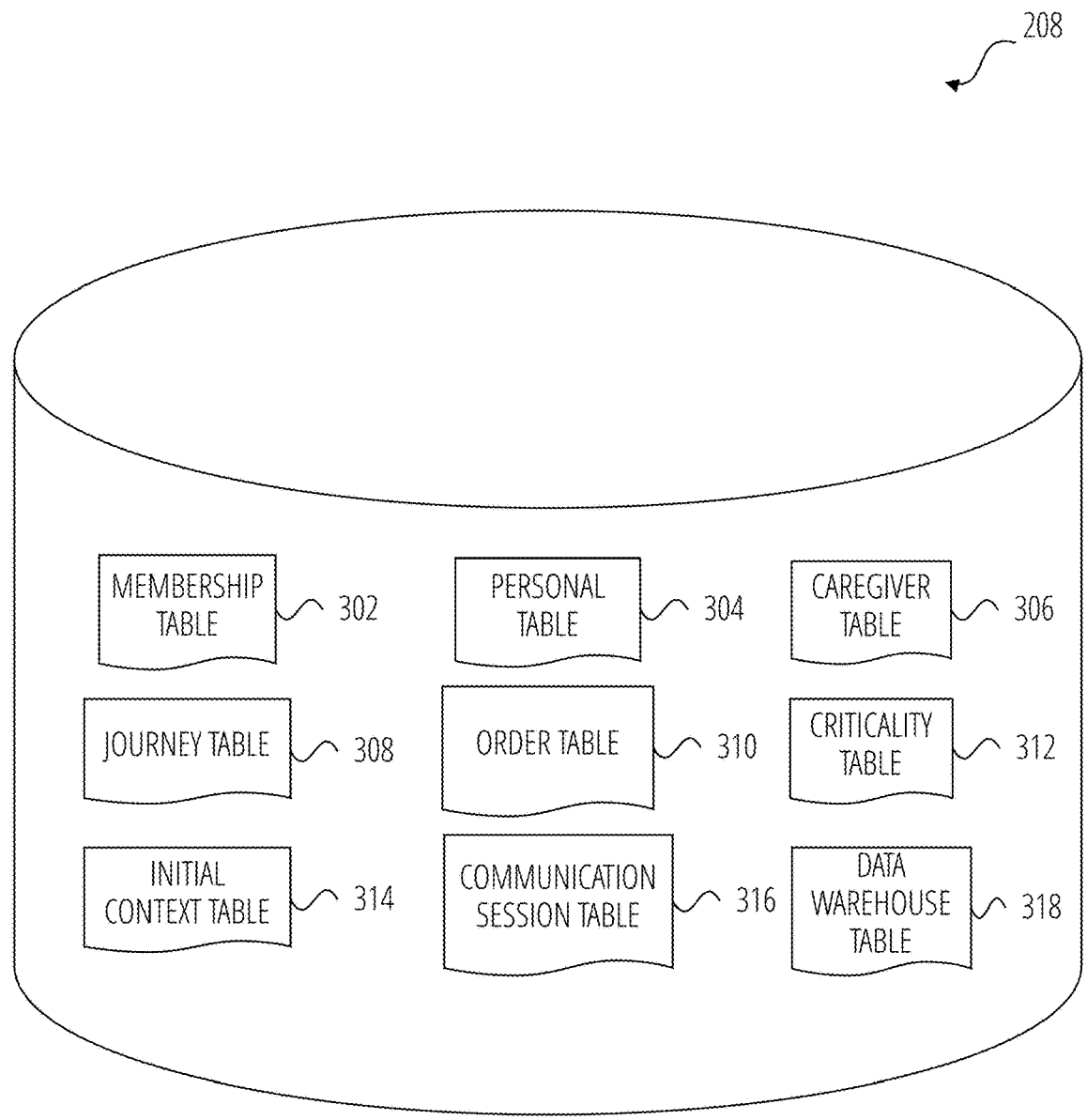
FIG. 3 is a schematic diagram illustrating data which may be stored in the database 208 of the agent logging system 110, according to various exemplary embodiments.

FIG. 3 is a schematic diagram illustrating data that is stored in the database 208 of the agent logging system 110, according to certain exemplary embodiments. While the content of the database 208 is shown to comprise a number of tables, the data could be stored in other types of data structures (e.g., as an object-oriented database). The database 208 includes a membership table 302, a personal table 304, a caregiver table 306, a journey table 308, an order table 310, a criticality table 312, initial context table 314, communication session table 316, and a data warehouse table 318. In one embodiment, the membership table 302, a personal table 304, a caregiver table 306, a journey table 308, an order table 310, a criticality table 312, initial context table 314, and communication session table 316 are updated in real-time such that these databases comprise real-time data. In one embodiment, the data warehouse table 318 includes historical data that is updated periodically.

The membership table 302 stores membership data that includes general membership data related to the organization, rules implemented by the organization for membership, member authentication requirements, etc. The membership data can be for example data required for authentication, specific call routing requirements, information on member benefits, information on the member's plan, etc.

The personal table 304 stores personal data related to all the members associated with the organization providing the customer service. The personal data can also be related to all other patients associated with the organization via the members. The personal table 304 can also include a personal graph that stores information regarding relationships and associations between members and other patients.

The caregiver table 306 stores caregiver data including rules applied by the organization to authenticate caregivers, identification data for each of the caregivers in the system and the patients each caregiver is associated with, etc. Caregiver data can be, for example, types of permissible data used to authenticate a person as a caregiver such as pin numbers, member numbers, etc. Caregiver data can also set the types of data to be obtained from the user to validate the caregiver relationship.

The journey table 308 stores customer journey information that includes information regarding when a member (e.g., user or patient) has completed tasks recently (e.g., explanation of benefits (EOB)). The journey table 308 can also include messaging data pertaining to available tasks (e.g., tasks that are open or not completed for each member). The messaging data indicates when a messaging was sent or received about a given task. The messaging data can be based on dates of messages pertaining to available tasks. For example, the messaging data, which is based on the date of the EOB, can be used to determine the length of time between the date of a communication session (e.g., a call from the member to the customer service server system 108) and the date of the EOB (e.g., the messaging data). Other completed tasks related to the member can be related to the messaging data, e.g., the dates as described herein. The messaging can also be an electronic communication (e.g., email or chat) or a telephone communication sent to a member or received from a member pertaining to the available tasks. Journey information can also include the available tasks which are tasks that are current available, the refills that are currently available, orders that were recently placed, and claims that were recently processed, etc.

The order table 310 stores order information for a member (e.g., user or patient). The order information can include a listing of available orders or tasks (e.g., orders that are open or not completed for each member). Available tasks can include open refills, recent refills for order status, etc. The order information can include the date of availability of the available tasks which can be used to determine how long an available task has been open relative to the date of a communication session (e.g., a call from the member to the customer service server system 108).

The criticality table 312 stores the criticality value for each task in association with the member. For example, the criticality value can be a range (e.g., between 0 and 1) that indicates the level of criticality for the task to be completed for this member (e.g., from not critical to critical).

The initial context table 314 stores initial context data related to the member (e.g., user or patient) that has established a communication session with the agent client device 12. Initial context data can include, for example, website login information, automatic number identifier, and telephone number. Initial context data can also include member account information such as name, address, employer, medication, insurance information, preferred pharmacy, and information on member's spouse or dependents.

The communication session table 316 stores communication session data which is data related to a communication session between the agent client device 102 and the member-related client device 104. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, transcribed text of full utterances provided by the user.

The data warehouse table 318 stores historical data including all the available tasks for a membership (e.g., the member, dependents, etc.). The historical data can also include a history of existing call records, a history of completed tasks, and a historical view of the user's criticality pertaining to different situations and conditions. The historical data can include the date of availability of the available tasks which can be used to determine how long an available task has been open relative to the date of a communication session (e.g., a call from the member to the customer service server system 2). In one embodiment, the historical data also includes the length of time that an available task has been open relative to the date of a communication session. The historical data can also include messaging data pertaining to available tasks (e.g., tasks that are open or not completed for each member). The messaging data indicates when a messaging was sent or received about a given task. The messaging data can be based on dates of messages pertaining to available tasks. For example, the messaging data, which is based on the dates of messages pertaining to available tasks, can be used to determine the length of time between the date of a communication session (e.g., a call from the member to the customer service server system 108) and the dates of messages pertaining to available tasks. In one embodiment, the historical data also includes the length of time between the dates of messages pertaining to available tasks and the date of the communication session.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems, such as the systems described in FIG. 1 and/or FIG. 9.

TRAINING THE AGENT LOGGING SYSTEM

Figure 4:
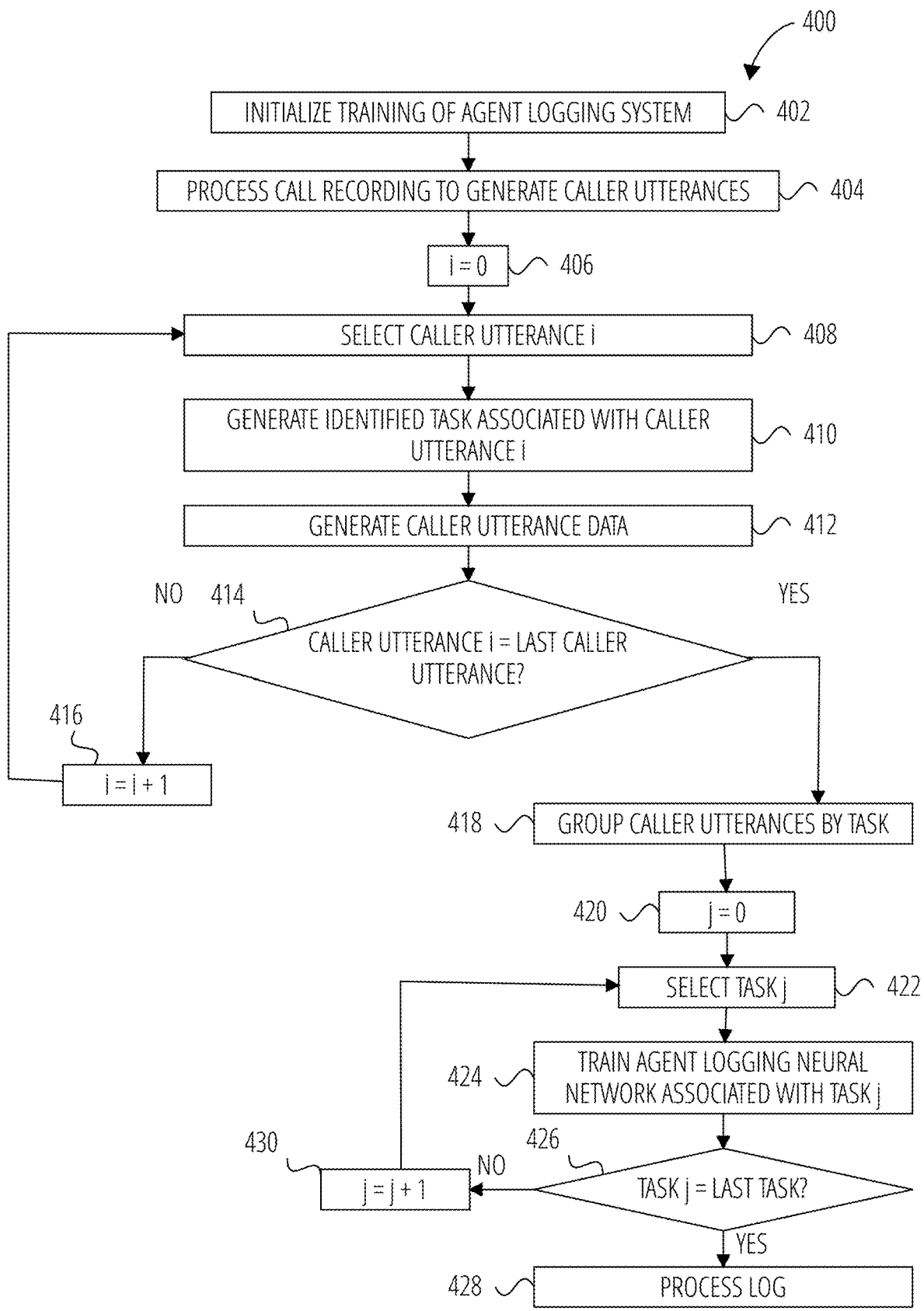
FIG. 4 is a flowchart of an exemplary process 400 of training the agent logging system 110 to generate a merged agent log according to various aspects of the disclosure.

FIG. 4 is a flow diagram of an exemplary process 400 of training the agent logging system 110 to generate an agent log according to various aspects of the disclosure. The process 400 can be performed by the customer service server system 108 in FIG. 1. In one embodiment, a processor (or circuitry dedicated to performing instructed tasks) included in the customer service server system 108 performs the process 400 or causes the customer service server system 108 to perform the process 400.

Process 400 starts, at operation 402, the processor initializes the training of the agent logging system 110. In some embodiments, the processor initializes the training of the agent logging application server 204. Further details on the initialization in operation 402 is discussed with reference to FIG. 5.

At operation 404, the processor processes a call recording to generate caller utterances including audio utterances and transcribed caller utterances. In one embodiment, the call recording is a recorded communication session between a caller (e.g., a user or a member) on a member-related client device 104 and an agent on an agent client device 102 used for system training purposes. Further details on the processing in operation 404 is discussed with reference to FIG. 6.

In order to process each of the caller utterances, at operation 406, the processor sets an index i to 0 and at operation 408, the processor selects the caller utterance i.

At operation 410, the processor generates an identified task associated with the caller utterance i. In one embodiment, the processor causes the task determination system 112 to perform the operation 410 and to generate the identified task. The task determination system 112 can process the caller utterance i using neural networks to determine the task that the caller is requesting. The caller utterance i can be a transcribed utterance in an example embodiment. The caller utterance i can be an audio utterance or string in an example embodiment. Each of the tasks available on the customer service server system 108 can be assigned to a specific neural network. The neural networks used by the task determination system 112 can be a Convolutional Neural Network (CNN).

At operation 412, the processor generates caller utterance data associated with the identified task i. The caller utterance data can include the identified task, the speaker associated with the caller utterance (e.g., identification of the user, member or patient number, etc.), and the start and end times of the caller utterance. The processor can also store the caller utterance data can in the database 208 in association with the identified task i and the caller utterance i.

At operation 414, the processor determines whether the caller utterance i is the last caller utterance in the call recording. If the caller utterance i is not the last caller utterance, at operation 416, the processor increases the value of i by 1 and sets the index i to i+1 (e.g., i=i+1) and the process 400 proceeds to operation 408. If the caller utterance i is the last caller utterance, the processor proceeds to operation 418.

At operation 418, the processor groups the caller utterances by identified task. For example, all the caller utterances that are pertain to the same identified task are grouped together. In one embodiment, the processor orders the groups of caller utterances by start time of the caller utterance (e.g., start timestamp).

In order to process each of the groups of caller utterances by identified task, at operation 420, the processor sets an index j to 0 and at operation 422, the processor selects the identified task j.

At operation 422, the processor also selects the group of caller utterances that are associated with task j and at operation 424, the processor trains the agent logging neural network that is associated with task j from the agent logging neural networks 206. To train the agent logging neural network that is associated with task j, the processor can provide as inputs to the agent logging neural network that is associated with task j, for example: the group of caller utterances that are associated with the task j, the data associated with the patient (e.g., the member, the user, or the caller) and a training log that is an expected agent log.

At operation 426, the processor determines whether the task j is the last task associated with a group of caller utterances to be processed in the call recording. If the task j is not the last task associated with a group of caller utterances to be processed, at operation 430, the processor increases the value of j by 1 and sets the index j to j+1 (e.g., j=j+1) and the process 400 proceeds to operation 422. If the task j is the last task associated with a group of caller utterances to be processed, the processor proceeds to operation 428.

At operation 428, the processor processes the agent log. The processor can mark each call log that is generated with missing information such as tasks (e.g., order refill, order status, etc.) and variables (e.g., member identification, prescription number, etc.). In one example, the highest possible score for a call is a value of 1. The processor can process the agent log and score the agent log. The total score for the agent log can be computed using the following equation:

$$\text{Total Score} = 1 - \left( W_{Tasks} * \frac{\text{\# of Missing Tasks}}{\text{\# Total Tasks}} \right) + \left( W_{Variables} * \frac{\text{\# Missing Variables}}{\text{\# Total Variables}} \right)$$

In this equation, the $W_{Tasks}$ is the weight of the tasks and $W_{variables}$ is the weight of the variables. The $W_{Tasks}$ and $W_{variables}$ are received during initialization of training at operation 402, as further discussed in FIG. 5 below. The number of total tasks and number of total variables can also be known and provisioned during initialization of training at operation 402.

In one embodiment, to render more robust the testing algorithm, the processor further processes the agent log in operation 428 by organizing the agent log by task, my start time of the group of caller utterances, by name of the speaker, etc.

Once trained, the agent logging neural networks 206 can output the agent log for each task associated therewith using the caller utterance and call log. In one embodiment, the agent logging neural networks 206 processes the caller utterance and call log at an input layer, an embed layer, an LSTM layer, an Attention layer, and an output layer. The embed layer, LSTM layer, and Attention layer help improve the log generating accuracy while the output layer is the final layer that receives results and/or values and outputs the agent log. In one embodiment, the output layer returns the agent log associated with the task associated with the LSTM neural network. All of the available tasks of different task types on the customer service server system 108 can be associated with the agent logging neural networks 206. Once the processor trains the agent logging neural networks 206, the processor ends the process 400. It is understood that the processor can repeat the process 400 if multiple call recordings are received.

Figure 5:
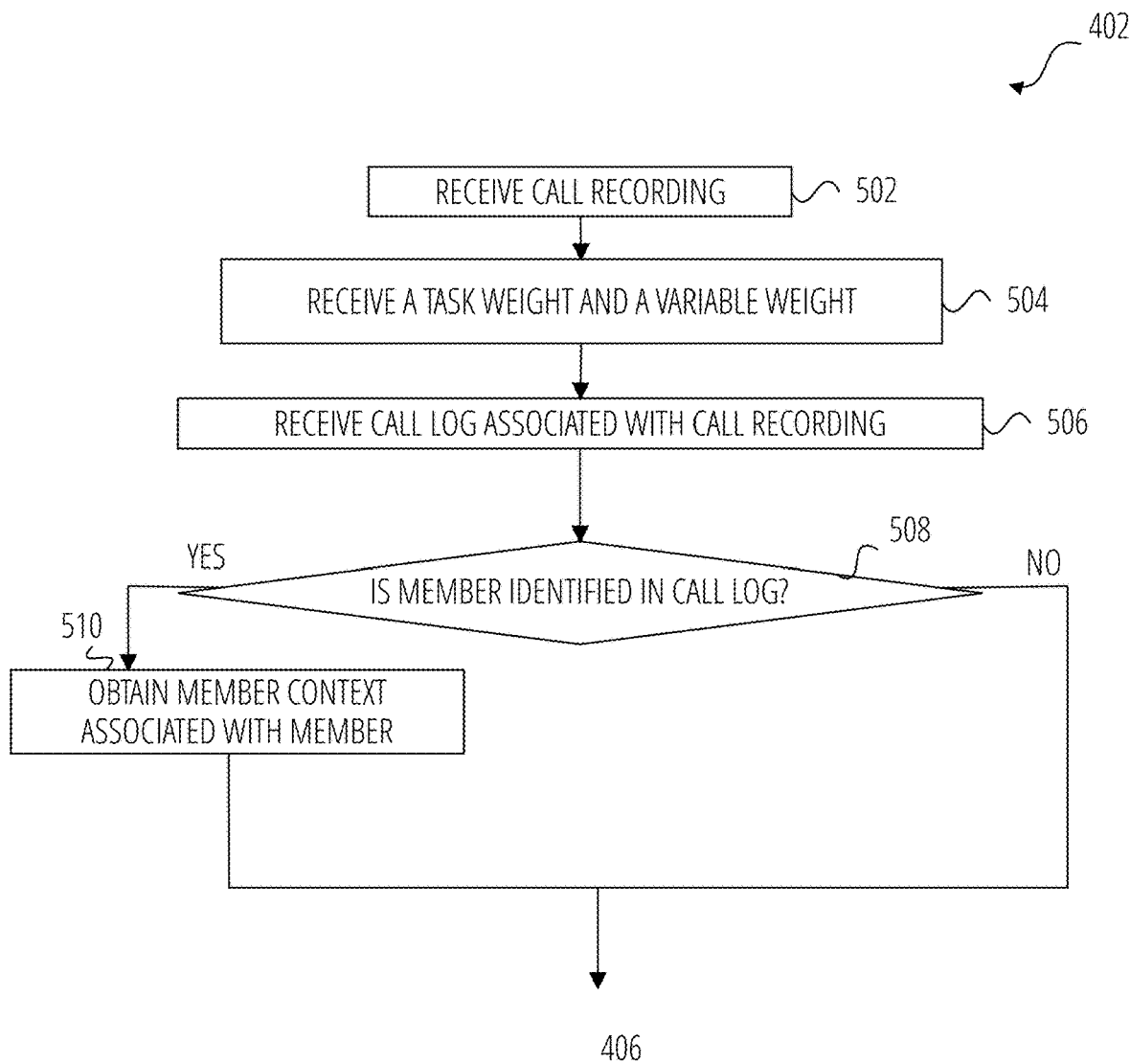
FIG. 5 is a flowchart of an exemplary process of initiating the training (operation 402) in the process 400 of training the agent logging system 110 from FIG. 4 according to various aspects of the present disclosure.

Initializing Training of Agent Logging System:

FIG. 5 is a flow diagram of an exemplary process of initiating the training (operation 402) in the process of training the agent logging system 110 from FIG. 4 according to various aspects of the present disclosure. In one embodiment, the processor causes the agent logging system 110 to perform the process in FIG. 5.

At operation 502, the processor receives the call recording that is a recording of the communication session between the caller and the agent (e.g., through agent client device 102 and member-related client device 104).

At operation 504, the processor receives the weight of the task ($W_{Tasks}$) and weight of the variables ($W_{variables}$). For the purposes of training the agent logging system 110, the weights are provided to score the agent log that is generated by the agent logging system 110. In one example, the sum of the weight of the task ($W_{Tasks}$) and weight of the variables ($W_{variables}$) equals to 1.

At operation 506, the processor receives the call log associated with the call recording. The call log can include, for example, a listing of each task or transaction involved in the call recording, start and end times of each caller utterance, the start and end times of each task, identified members during the call recording, and whether the tasks were successfully completed.

At operation 508, the processor determines for each task whether a member is identified in the call log. If a member is identified, at operation 510, the processor obtains the member context associated with the member that is identified. The member context can be for example, the initial context data such as a website login information, an automatic number identifier (ANI), and telephone number and member account information such as name, address, employer, medication, insurance information, preferred pharmacy, and information on member's spouse or dependents.

Figure 6:
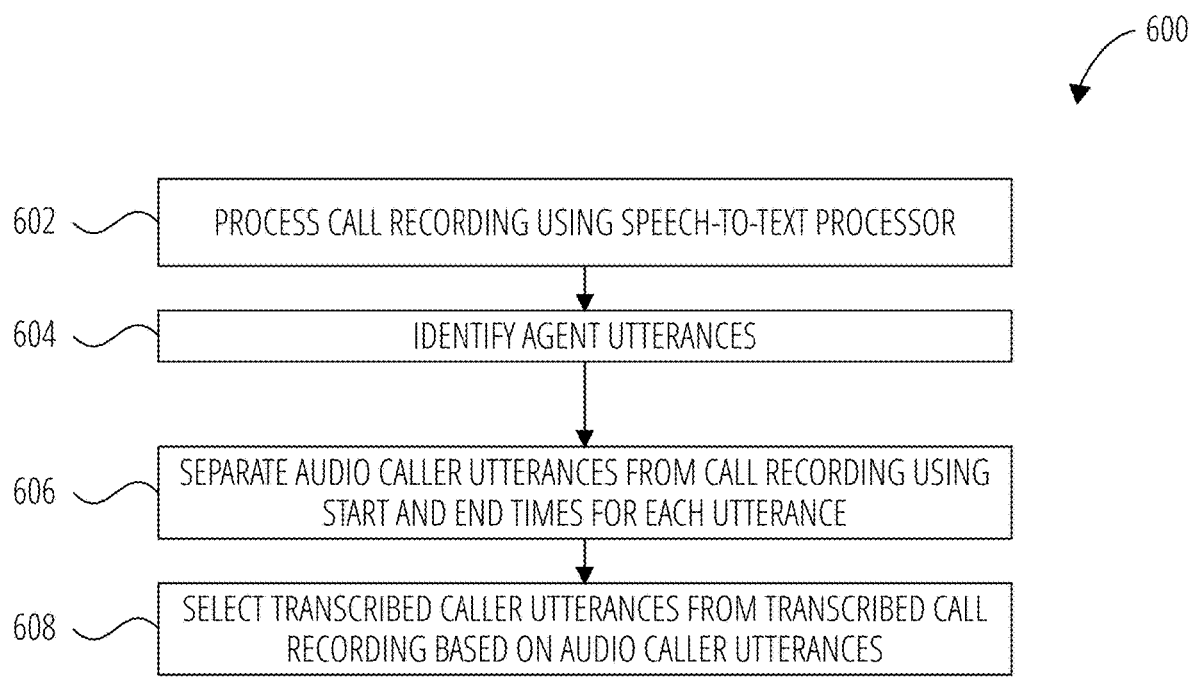
FIG. 6 is a flowchart of an exemplary process 600 of processing the call recording to generate caller utterances including audio and transcribed caller utterances in the method of training the agent logging system 110 from FIG. 4 (operation 404) or in the process 700 of generating a merged agent log from FIG. 7 (operation 704) according to various aspects of the present disclosure.
Figure 7:
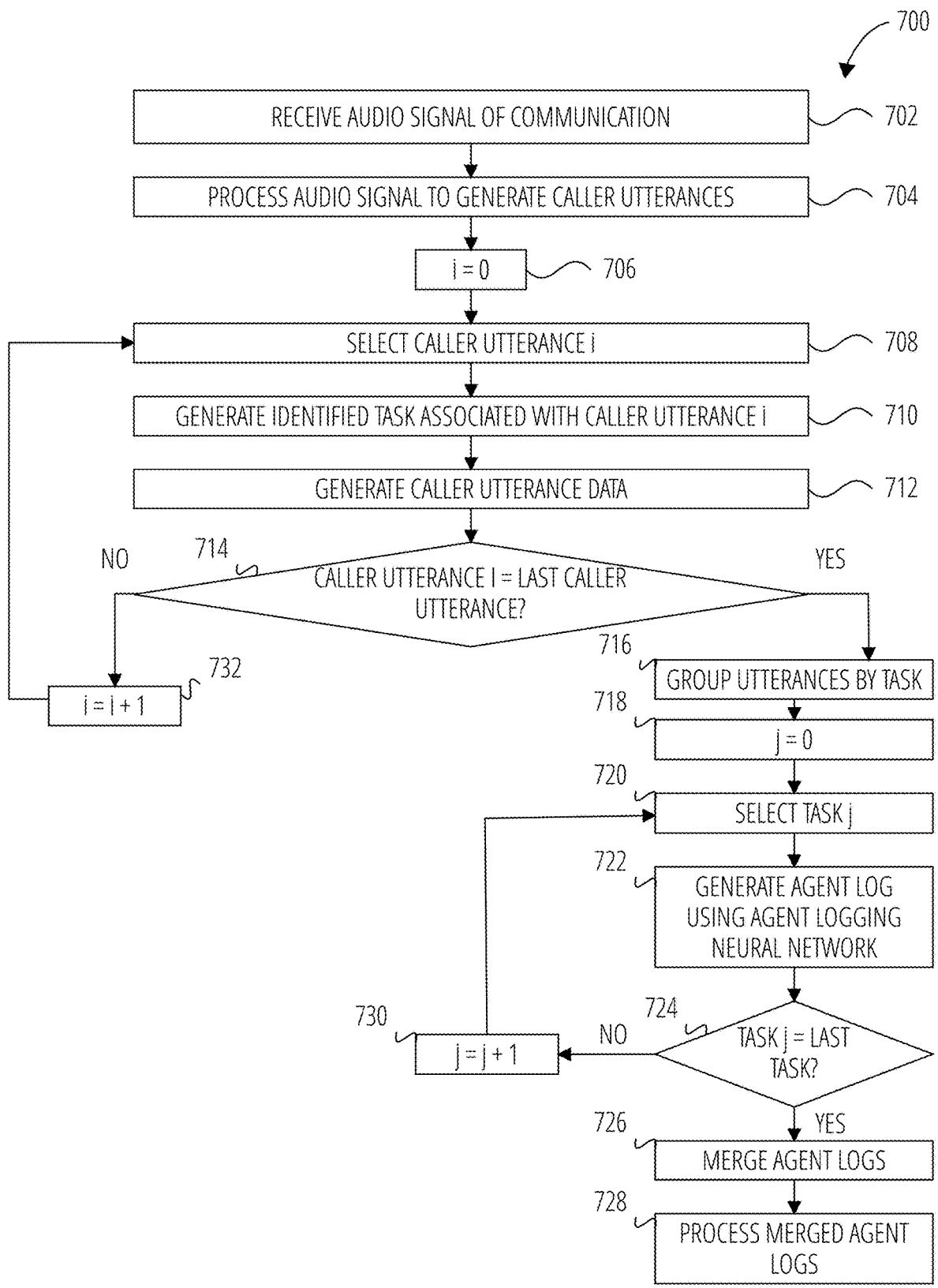
FIG. 7 is a flowchart of an exemplary process 700 of generating a merged agent log according to various aspects of the disclosure.

Processing Call Recording to Generate Caller Utterances:

FIG. 6 is a flow diagram of an exemplary process 600 of processing the call recording to generate caller utterances including audio utterances and transcribed caller utterances (operation 404) in the method of training the agent logging system 110 from FIG. 4 or (operation 704) in the method of generating a merged agent log from FIG. 7, according to various aspects of the present disclosure. It is noted that while the method in FIG. 6 refers to a call recording, for the purposes of the process of generating a merged agent log from FIG. 7, a call recording or a communication session (e.g., an interactive voice response (IVR) or a voice call) can be processed, in accordance to some embodiments. In one embodiment, the processor causes the speech-to-text processor that is included in the agent logging system 110 to perform the process in FIG. 6. In an example embodiment, the processor segments the audio file into individual utterances by the caller, e.g., the user.

At operation 602, the processor processes the call recording using the speech-to-text processor. The processing of the call recording (or communication session) can include transcribing the call recording into a transcribed call recording, identifying separate parties in the call recording and generating start and end times for each utterance included in the call recording. The processing of the call recording can include identifying separate parties in the call recording and generating start and end times for each utterance included in the call recording. The separate parties in the call recording include, for example, the caller and the agent. In one embodiment, using the start and end times for each utterance included in the call recording, the processor can generate the utterances in the call recording.

At operation 604, the processor identifies agent utterances from the utterances included in the audio signal. In one embodiment, the processor uses a Bayesian network to deduce from the utterances in the audio signal which of the parties speaking in the utterances is the agent.

At operation 606, the processor separates the audio caller utterances from the call recording using the start and end times for each utterance included in the call recording.

At operation 608, the processor selects the transcribed caller utterances from the transcribed call recording based on the audio caller utterances. The processor can also select the audio caller utterances from the caller only audio file based on the audio caller utterances. Each utterance can be an individual string.

Generating an Agent Log Using Agent Logging System:

Once the agent logging system 110 is trained, the agent logging system 110 can be used to generate the merged agent log that the agent log for each task in the communication session based on the content of the communication between the caller and the agent. FIG. 7 is a flowchart of an exemplary process 700 of generating a merged agent log according to various aspects of the disclosure. In one embodiment, the processor causes the agent logging system 110 to perform the method in FIG. 7.

The method 700 starts, at operation 702, with the processor receiving an audio signal of a communication session between a member-related client device 104 and an agent client device 102. The caller is associated with the member-related client device 104. A human agent or an automated agent can be associated with the agent client device 102. The communication session can be an interactive voice response (IVR) or a voice call.

At operation 704, the processor processes the audio signal to generate to generate caller utterances including audio utterances and transcribed caller utterances. In one embodiment, the audio signal can be a recorded communication session between a caller (e.g., a user or a member) on a member-related client device 12 and an agent on an agent client device 11. Further details on the processing in operation 702 is discussed with reference to FIG. 6.

In order to process each of the caller utterances, at operation 706, the processor sets an index i to 0 and at operation 708, the processor selects the caller utterance i.

At operation 710, the processor generates an identified task associated with the caller utterance i. In one embodiment, the processor causes the task determination system 112 to perform the operation 710 and to generate the identified task. The task determination system 112 can process the caller utterance i using neural networks to determine the task that the caller is requesting. The caller utterance i can be a transcribed utterance in an example embodiment. The caller utterance i can be an audio utterance or string in an example embodiment. Each of the tasks available on the customer service server system 108 can be assigned to a specific neural network. The neural networks used by the task determination system 112 can be a Convolutional Neural Network (CNN).

At operation 712, the processor generates caller utterance data associated with the identified task i. The caller utterance data can include the identified task, the speaker associated with the caller utterance (e.g., identification of the user, member or patient number, etc.), and the start and end times of the caller utterance. The processor can also store the caller utterance data can in the database 208 in association with the identified task i and the caller utterance i.

At operation 714, the processor determines whether the caller utterance i is the last caller utterance in the call recording. If the caller utterance i is not the last caller utterance, at operation 732, the processor increases the value of i by 1 and sets the index i to i+1 (e.g., i=i+1) and the process 400 proceeds to operation 708. If the caller utterance i is the last caller utterance, the processor proceeds to operation 716.

At operation 716, the processor groups the caller utterances by identified task. For example, all the caller utterances that are pertain to the same identified task are grouped together. In one embodiment, the processor orders the groups of caller utterances by start time of the caller utterance (e.g., start timestamp).

In order to process each of the groups of caller utterances by identified task, at operation 718, the processor sets an index j to 0 and at operation 720, the processor selects the identified task j.

At operation 720, the processor also selects the group of caller utterances that are associated with task j and at operation 722, the processor generates an agent log associated with task j using the agent logging neural network from the agent logging neural networks 206 that is associated with task j. In one embodiment, the processor selects the agent logging neural network from the agent logging neural networks 206 that is associated with task j and provides the group of caller utterances that are associated with task j to the selected agent logging neural network. The processor can also provide the portion of the call log associated with the group of caller utterances of task j to the selected agent logging neural network.

The processor can also provide the caller utterance data including the identified tasks, the speaker associated with the group of caller utterances, and a start time of the caller utterances and an end time of the caller utterances. The agent logging neural networks 206 can output the agent log for each task associated therewith using the caller utterance and caller utterance data. In one embodiment, the agent logging neural networks 206 processes the caller utterance and call log at an input layer, an embed layer, an LSTM layer, an Attention layer, and an output layer. The embed layer, LSTM layer, and Attention layer help improve the agent log generating accuracy while the output layer is the final layer that receives results and/or values and outputs the agent log. In one embodiment, the output layer returns the agent log associated with the task associated with the LSTM neural network. All of the available tasks of different task types on the customer service server system 108 can be associated with the agent logging neural networks 206.

At operation 724, the processor determines whether the task j is the last task associated with a group of caller utterances to be processed in the audio signal. If the task j is not the last task associated with a group of caller utterances to be processed, at operation 730, the processor increases the value of j by 1 and sets the index j to j+1 (e.g., j=j+1) and the process 700 proceeds to operation 720. If the task j is the last task associated with a group of caller utterances to be processed, the processor proceeds to operation 726.

At operation 726, the processor merges the agent logs that are generated for each of the tasks in the audio signal to generate a merged agent log. The processor can merge the agent logs based on common start times of the caller utterances, common identifying information such as prescription number, order number, etc. The merged agent log can be ordered by the start time of the caller utterances therein. The merged agent log can comprise, for example, member context, caller utterance data, the identified tasks, a start time of each of the identified tasks, and an end time of each of the identified tasks, a search variable associated with each of the identified tasks, or success value associated with each of the identified tasks.

At operation 728, the processor processes the merged agent log. For example, the processor can process the merged agent log by comparing the merged agent log with a test agent log to generate a difference output and by scoring the merged agent log file using the difference output. For example, the test agent log can be an agent log generated using process 400 of FIG. 4 and that is stored in the database 208. The difference output can be obtained by using an algorithm to detect change in hierarchical structured information. Similar to the processing in operation 428 of FIG. 4, at operation 728, the processor can score the merged agent log based on any missing information such as tasks (e.g., order refill) or variables (e.g., prescription number, member identification, etc.). In one example, the highest possible score for a call is a value of 1. The total score for the merged agent log can be computed using the equation:

$$\text{Total Score} = 1 - \left(W_{Tasks} * \frac{\text{\# of Missing Tasks}}{\text{\# Total Tasks}}\right) + \left(W_{Variables} * \frac{\text{\# Missing Variables}}{\text{\# Total Variables}}\right)$$

The processor can also process the merged agent log to generate a listing occurrences where the human agent logs scored better than the agent logging system 110's merged agent logs, or generate a statistical analysis of performance (e.g., comparing the statistics of past models).

SOFTWARE ARCHITECTURE

Figure 8:
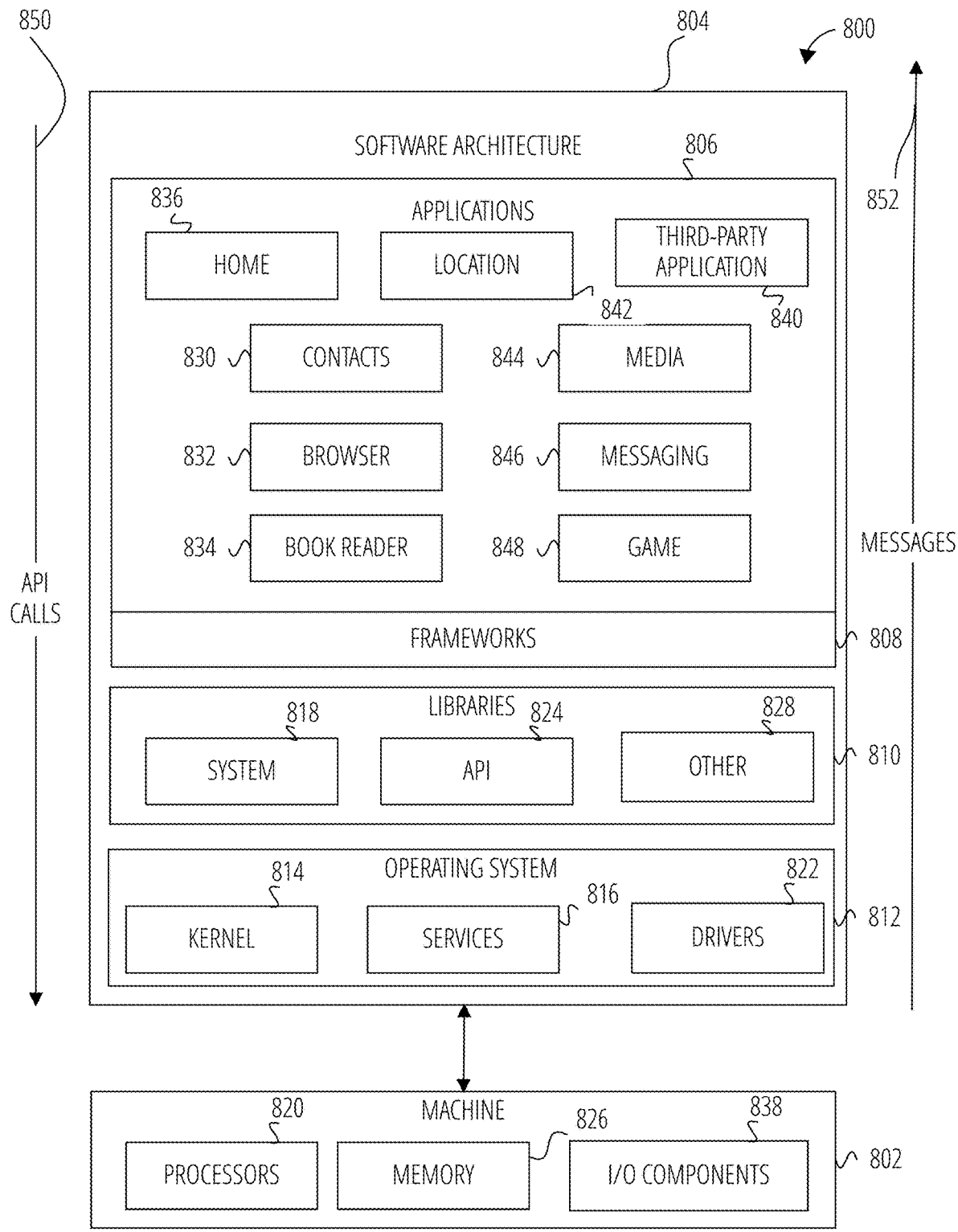
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

MACHINE ARCHITECTURE

Figure 9:
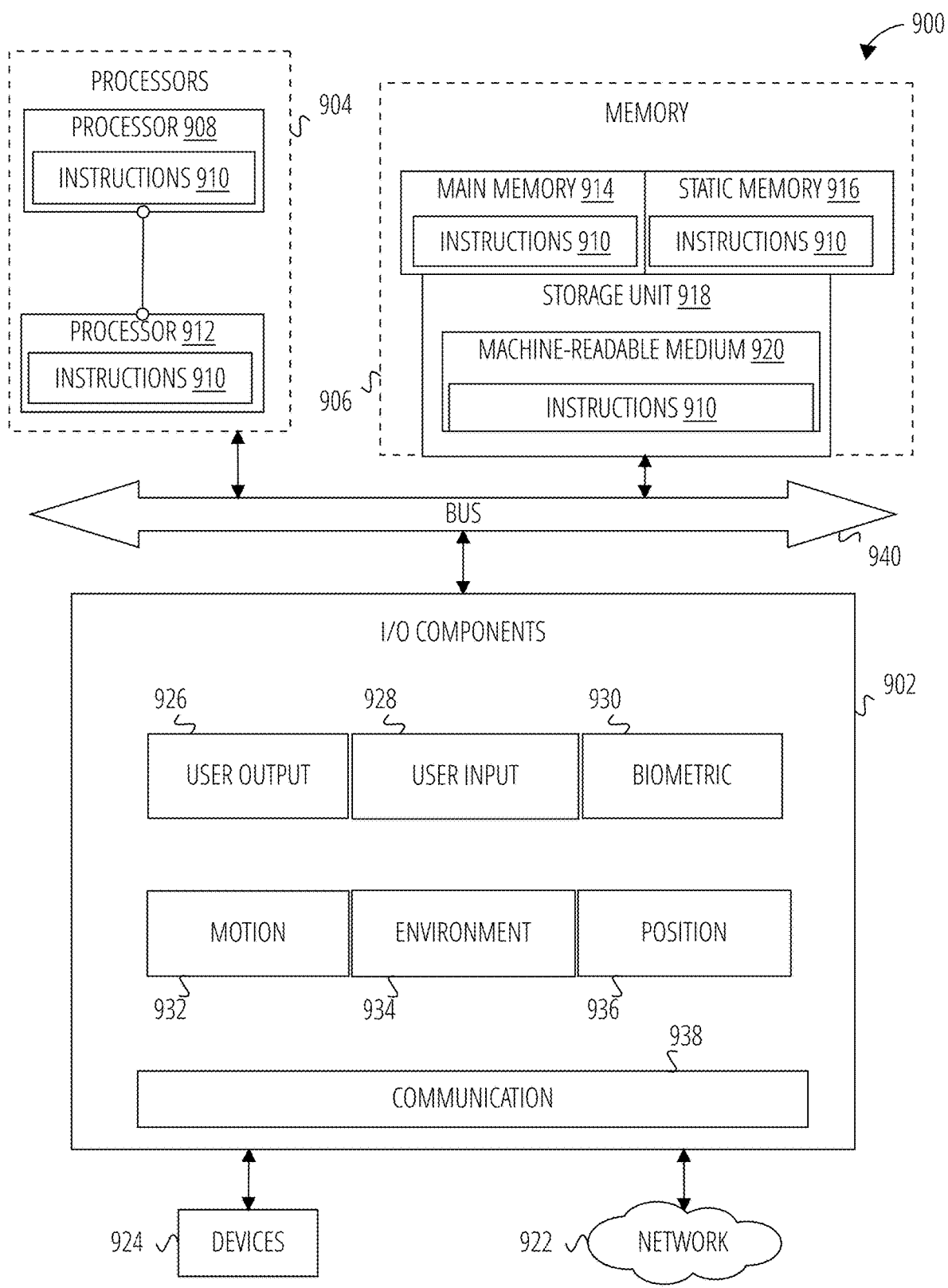
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the agent client device 102 or any one of a number of server devices in customer service server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 638, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope) and the like.

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
a processor; and
a memory component having instructions stored thereon, when executed by the processor, causes the processor to perform operations comprising:
receiving an audio signal of a communication session between a member-related client device and an agent client device, wherein a caller is associated with the member-related client device;
processing the audio signal to generate a plurality of caller utterances;
generating identified tasks based on the caller utterances;
generating caller utterance data including the identified tasks and a start time of the caller utterances and an end time of the caller utterances;
grouping the caller utterances based on the identified tasks; and
for each of the identified tasks, generating an agent log using an agent logging neural network, wherein generating the agent log is based on the caller utterances.

2. The system of claim 1, wherein grouping the caller utterances based on the identified tasks further comprises ordering the caller utterances based on the start time of the caller utterances.

3. The system of claim 1, wherein the processor to perform operations further comprising:
merging the agent log of each of the identified tasks to generate a merged agent log, wherein the merged agent log is ordered by the start time of the caller utterances.

4. The system of claim 3, wherein the processor to perform operations further comprising:
processing the merged agent log, wherein processing the merged agent log comprises:
comparing the merged agent log with a test agent log to generate a difference output; and
scoring the merged agent log file using the difference output.

5. The system of claim 3, wherein the merged agent log comprises member context, caller utterance data, the identified tasks, a start time of each of the identified tasks, and an end time of each of the identified tasks, a search variable associated with each of the identified tasks, or success value associated with each of the identified tasks.

6. The system of claim 1, wherein processing the audio signal to generate the plurality of caller utterances further comprises:
processing the audio signal using a speech-to-text engine to transcribe the audio signal into a transcribed audio signal,
to identify separate parties in the audio signal, wherein the separate parties include the caller and an agent, and
to provide the start and end times for each of a plurality of utterances included in the audio signal;
identifying agent utterances from the plurality of utterances included in the audio signal;
separating the audio caller utterance from the audio signal using the start and end times for each of a plurality of utterances; and
selecting the transcribed caller utterance from the transcribed audio signal based on the audio caller utterance.

7. The system of claim 1, wherein the communication session includes at least one of: an interactive voice response (IVR) or a voice call.

8. A method comprising:
receiving an audio signal of a communication session between a member-related client device and an agent client device, wherein a caller is associated with the member-related client device;
processing the audio signal to generate a plurality of caller utterances;
generating identified tasks based on the caller utterances;
generating caller utterance data including the identified tasks and a start time of the caller utterances and an end time of the caller utterances;
grouping the caller utterances based on the identified tasks; and
for each of the identified tasks, generating an agent log using an agent logging neural network, wherein generating the agent log is based on the caller utterances.

9. The method of claim 8, wherein grouping the caller utterances based on the identified tasks further comprises ordering the caller utterances based on the start time of the caller utterances.

10. The method of claim 8, further comprising:
merging the agent log of each of the identified tasks to generate a merged agent log, wherein the merged agent log is ordered by the start time of the caller utterances.

11. The method of claim 10, further comprising:
processing the merged agent log, wherein processing the merged agent log comprises:
comparing the merged agent log with a test agent log to generate a difference output; and
scoring the merged agent log file using the difference output.

12. The method of claim 10, wherein the merged agent log comprises member context, caller utterance data, the identified tasks, a start time of each of the identified tasks, and an end time of each of the identified tasks, a search variable associated with each of the identified tasks, or success value associated with each of the identified tasks.

13. The method of claim 8, wherein processing the audio signal to generate the plurality of caller utterances further comprises:
processing the audio signal using a speech-to-text engine to transcribe the audio signal into a transcribed audio signal,
to identify separate parties in the audio signal, wherein the separate parties include the caller and an agent, and
to provide the start and end times for each of a plurality of utterances included in the audio signal;
identifying agent utterances from the plurality of utterances included in the audio signal;
separating the audio caller utterance from the audio signal using the start and end times for each of a plurality of utterances; and
selecting the transcribed caller utterance from the transcribed audio signal based on the audio caller utterance.

14. The method of claim 8, wherein the communication session includes at least one of: an interactive voice response (IVR) or a voice call.

15. A non-transitory storage medium having instructions stored thereon, when executed by a processor causes the processor to perform operations comprising:

receiving an audio signal of a communication session between a member-related client device and an agent client device, wherein a caller is associated with the member-related client device;

processing the audio signal to generate a plurality of caller utterances;

generating identified tasks based on the caller utterances;

generating caller utterance data including the identified tasks and a start time of the caller utterances and an end time of the caller utterances;

grouping the caller utterances based on the identified tasks; and for each of the identified tasks, generating an agent log using an agent logging neural network, wherein generating the agent log is based on the caller utterances.

16. The non-transitory storage medium of claim 15, wherein grouping the caller utterances based on the identified tasks further comprises ordering the caller utterances based on the start time of the caller utterances.

17. The non-transitory storage medium of claim 15, wherein the processor to perform operations further comprising:

merging the agent log of each of the identified tasks to generate a merged agent log, wherein the merged agent log is ordered by the start time of the caller utterances.

18. The non-transitory storage medium of claim 17, wherein the processor to perform operations further comprising:

processing the merged agent log, wherein processing the merged agent log comprises:

comparing the merged agent log with a test agent log to generate a difference output; and scoring the merged agent log file using the difference output.

19. The non-transitory storage medium of claim 17, wherein the merged agent log comprises member context, caller utterance data, the identified tasks, a start time of each of the identified tasks, and an end time of each of the identified tasks, a search variable associated with each of the identified tasks, or success value associated with each of the identified tasks.

20. The non-transitory storage medium of claim 15, wherein processing the audio signal to generate the plurality of caller utterances further comprises:

processing the audio signal using a speech-to-text engine
  to transcribe the audio signal into a transcribed audio signal,
  to identify separate parties in the audio signal, wherein the separate parties include the caller and an agent, and
  to provide the start and end times for each of a plurality of utterances included in the audio signal;

identifying agent utterances from the plurality of utterances included in the audio signal;

separating the audio caller utterance from the audio signal using the start and end times for each of a plurality of utterances; and selecting the transcribed caller utterance from the transcribed audio signal based on the audio caller utterance.

* * * * *